United States Patent [19]

Cheung et al.

[11] 4,062,823

[45] Dec. 13, 1977

[54] HYBRID WATER-BASED ENAMELS WITH PARTIALLY CROSSLINKED LATEXES

[75] Inventors: Mo-Fung Cheung, Warren; Ray A. Dickie, Birmingham, both of Mich.

[73] Assignee: Ford Motor Company, Dearborn, Mich.

[21] Appl. No.: 724,823

[22] Filed: Sept. 20, 1976

[51] Int. Cl.² .................. C08L 61/24; C08L 61/28
[52] U.S. Cl. ........................ 260/29.4 UA; 260/851; 260/856
[58] Field of Search ............... 260/29.4 UA, 29.4 R, 260/851, 856

[56] References Cited

U.S. PATENT DOCUMENTS

| | | | |
|---|---|---|---|
| 3,361,696 | 1/1968 | Bolgiano et al. | 260/29.7 |
| 3,919,154 | 11/1975 | Chang et al. | 260/29.4 UA |
| 3,926,888 | 12/1975 | Cheung et al. | 260/29.4 UA |
| 3,928,273 | 12/1975 | Chang et al. | 260/29.4 UA |

*Primary Examiner*—Theodore E. Pertilla
*Attorney, Agent, or Firm*—Olin B. Johnson; Keith L. Zerschling

[57] ABSTRACT

Water-based paints having improved properties are disclosed. Improvements in resistance to crater formation and dirt pick-up is achieved by incorporation of crosslinked latex into a water-based paint comprising (a) a mixture of at least two copolymers of acrylic monomers, (c) an amine and (d) water or water and an organic solvent.

7 Claims, No Drawings

HYBRID WATER-BASED ENAMELS WITH PARTIALLY CROSSLINKED LATEXES

BACKGROUND OF THE INVENTION

This invention is concerned with an improvement in water-based paint such as those disclosed in U.S. Pat. Nos. 3,926,888, 3,928,273 and 3,919,154, the disclosures of which are incorporated hereby by reference. The water-based paints of these patents, exclusive of optional components such as pigments, particulate fillers, catalysts, stabilizer polymers and organic solvents, comprise a liquid continuous phase. About 30 to about 50% by weight of this phase, exclusive of the aforecited optional components, is made up of a mixture of (a) an amino resin crosslinking agent, (b) a mixture of at least two copolymers of acrylic monomers, and (c) an amine. The balance is water or, in certain embodiments water and an organic solvent. The mixture of copolymers comprises (1) about 5 to about 50, preferably about 10 to about 30, parts by weight of a "solution polymer", i.e., a carboxy-functional copolymer of acrylic monomers that (i) is at least partially neutralized with an amine, (ii) is soluble in said aqueous phase, (iii) has average molecular weight ($\overline{M}_n$) in the range of about 3,000 to about 20,000, and (iv) has Tg in the range of $-15°$ to $50°$ C., and (2) about 50 to about 95, preferably about 70 to about 90, parts by weight of an "emulsion polymer", i.e., a copolymer of acrylic monomers having carboxy, hydroxy, or carboxy and hydroxy functionality that (i) is essentially insoluble in said continuous phase, (ii) has average molecular weight ($\overline{M}_n$) in the range of about 3,000 to about 20,000 and (iii) has Tg of $-15°$ to $50°$ C. The amino resin crosslinking agent is present in an amount in the range of about 15 to about 35 weight percent of the sum of the weight of solution polymer and the weight of emulsion polymer. The amine is a water-soluble amine and is present in an amount sufficient to solubilize the solution polymer in the aqueous phase at a pH range of about 7 to about 10, most commonly in the range of about 7.1 to about 8.5.

THE INVENTION

It now has been discovered that the resistance of such paints to crater formation and dirt pick-up when applied as a coating film is substantially enhanced by the inclusion of a small amount of a di-, tri- or tetrafunctional acrylate or methacrylate with the usual monofunctional acrylates and methacrylates used to form the latex portion, i.e., the emulsion polymer. At least about 0.5 mole percent of the multifunctional monomer is required to obtain this beneficial effect. Above 2 mole percent of the multifunctional monomer results, upon completion, in a paint characterized by an unduly restricted flow, lower gloss and excessive orange peel.

Introduction of acrylates or methacrylates with multiple sites of olefinic unsaturation into the polymerization reaction used to form the emulsion polymer results in formation of a limited amount of crosslinked polymer. A chain transfer agent is used. The use of a chain transfer agent in combination with multiply unsaturated acrylates or methacrylates results in formation of a polymer having a bimodal molecular weight distribution. The lower portion of the distribution conforms to what one might expect if the multifunctional acrylate were not present ($\overline{M}_n$ 3,000 to 20,000), while the upper portion is a gel of undefined molecular weight (effectively infinite molecular weight).

The preferred formulations disclosed in the aforementioned patents is somewhat affected by the use of multifunctional acrylates and substantially less latex, i.e., emulsion polymer, relative to solution polymer is preferred. The mixture of copolymers in the paints of this invention advantageously comprise about 30 to about 70 parts weight of the solution polymer with the balance, i.e., about 70 to about 30 parts by weight, made up of the emulsion polymer.

As in U.S. Pat. No. 3,926,888, this invention may be practiced using a water-soluble, carboxy-functional, acrylic copolymer as a stabilizer polymer in the emulsion polymerization through which the emulsion polymer is produced, i.e., about 0.025 to about 5 parts by weight of a stabilizer polymer which is a carboxy-functional copolymer of acrylic monomers that is soluble in said aqueous solution, has average molecular weight ($\overline{M}_n$) lower than that of the solution polymer (the solution polymer used in substantial proportions with the emulsion polymer), and is introduced into the dispersion intimately mixed with at least one of said solution polymers and said emulsion polymers. In certain embodiments, hereinafter illustrated, these hybrid compositions include organic cosolvents while in other embodiments such solvents are not present.

When applied to the substrate to be coated by spraying, these water-based paints including pigments, particulate fillers, and catalysts, if any, contain between about 50 and about 65% by weight water or in those embodiments wherein such solvents are used, water and organic cosolvents.

Paint Preparation

A number of methods can be used to prepare the water-based paints of this invention.

In a first general method, at least one of the polymers, usually the solution polymer, is polymerized in solution in a water miscible or dilutable organic solvent while the other polymer, usually the emulsion polymer, is prepared by an emulsion polymerication in water. The resultant water-based paint will contain a conventional, essentially non-reactive, water-miscible or dilutable organic paint solvent. The concentration of organic solvent in such paints will be at least about 5% by volume of the volatile phase, i.e., organic solvent and water, and preferably in the range of about 10 to about 20 volume percent of the volatile phase.

In a second general method both the solution polymer and the emulsion polymer are prepared by emulsion polymerization in water. The paints thus prepared are prepared without organic solvents and thus employed free of same. Organic solvents in the amounts used in the first general method may be added to the dispersion, if desired.

A third general method is the same as the first general method except for the difference that in carrying out the emulsion polymerization the surfactant, i.e., surface active agent or emulsifier, is replaced by a solution polymer hereinafter more fully described.

A fourth general method is the same as the second general method except for the difference that in carrying out one or both, preferably both, of the emulsion polymerizations the surfactant is replaced by a solution polymer hereinafter more fully described.

The advantage provided by the third and fourth general methods is that elimination of the conventional surfactant eliminates the problem of incompatibility and water sensitivity associated with the use of surfactants.

Polymer Composition in Detail

A. The solution polymer in these paints has carboxy-functionality and may also have hydroxy-functionality and/or amide-functionality. These polymers contain about 5 to about 30 mole percent of acrylic or methacrylic acid and 70 to 95 mole percent of olefinically unsaturated monomers copolymerizable with such acid component. Preferably, these other olefinically unsaturated monomers are monoacrylates or monomethacrylates. In the embodiment wherein the primary solution polymer has only carboxy-functionality, these are preferably esters of acrylic acid or methacrylic acid and a $C_1$ – $C_8$ monohydric alcohol. $C_8$ – $C_{12}$ monovinyl hydrocarbons such as styrene, alpha methyl styrene, t-butyl styrene, and vinyl toluene may comprise up to about 30 mole percent of such polymer. Vinyl monomers such as vinyl chloride, acrylonitrile, methacrylonitrile and vinyl acetate may be included in the copolymer as modifying monomers. However, when employed, these modifying monomers should constitute only between about 0 to about 30, preferably 0 to about 15, mole percent of such polymer. In the embodiment wherein the solution polymer has both carboxy-functionality and hydroxyfunctionality, the copolymer contains about 5 to about 25 mole percent of acrylic or methacrylic acid, about 5 to about 25 mole percent of a hydroxyalkylacrylate or methacrylate, e.g., hydroxyethyl acrylate, hydroxypropyl acrylate, hydroxyethyl methacrylate or hydroxypropyl methacrylate, and a remainder of the same monofunctional monomers as set forth above for the solely carboxy-functional polymer. In still another embodiment, the polymer has amide-functionality in addition to carboxy-functionality. Such a polymer contains about 5 to about 25 mole percent acrylic acid or methacrylic acid, about 5 to about 25 mole percent of acrylamide, methacrylamide, N-methylolacrylamide, N-methylolmethacrylamide, or the alkyl ether of a methylolacrylamide or a methylolmethacrylamide, e.g., N-isobutoxymethylolacrylamide, with the remainder of the same monofunctional monomers as set forth above for the solely carboxy-functional polymer. A portion of the amidefunctional monomer may be replaced with an equimolar amount of one of the aforementioned hydroxyacrylates or hydroxymethacrylates.

Other monomers not heretofore mentioned may be used in these polymers if used in limited concentrations. These include 2-acrylamide-2-methylpropanesulfonic acid and methacryloyloxyethylphosphate, which may comprise up to about 3% of such polymer.

B. The emulsion polymer in these paints has carboxy-functionality, hydroxy-functionality or carboxy and hydroxy-functionality. These polymers contain 0 to 15 mole percent acrylic acid or methacrylic acid, preferably 0 to 10 mole percent, and 85 to 100 mole percent of other olefinically unsaturated monomers that are copolymerizable with each other and with the acid component when the latter is used. Such other olefinically unsaturated monomers are the same in type and of the same percentage distribution range as those heretofore disclosed for the solution polymer with the exceptions of: (1) the acid monomer content above noted and (2) the incorporation of 0.5 to 2.0 mole percent of olefinically unsaturated monomers bearing two or more sites of olefinic unsaturation. Preferred monomers for this purpose are di-, tri- and tetra-acrylates, methacrylates and vinyl hydrocarbons, exemplary of which are esters of acrylic or methacrylic acids and polyhydric $C_2$-$C_8$ alcohols, e.g., neopentyl glycol dimethacrylate, 1,6-hexanedioldiacrylate, 1,3-butyleneglycoldimethacrylate, trimethylolpropanetriacrylate, pentaerythritoltriacrylate, pentaerythritoltetraacrylate etc., and mixtures thereof; and divinyl benzene.

In those embodiments, wherein both the solution polymer and the emulsion polymer have hydroxy-functionality and carboxy-functionality, it is preferred to have a greater concentration of carboxy-functionality on the solution polymer relative to the emulsion polymer and a greater concentration of the hydroxy-functionality on the emulsion polymer relative to the solution polymer.

Thus, the combinations involved include (a) a carboxy-functional solution polymer and a hydroxy-functional emulsion polymer, (b) a carboxy-functional solution polymer and a carboxy-functional emulsion polymer, (c) a carboxy-functional solution polymer and a carboxy-functional, hydroxy-functional emulsion polymer, (d) a carboxy-functional and hydroxy-functional solution polymer and a hydroxy-functional emulsion polymer, (e) a carboxy-functional, hydroxy-functional solution polymer and a carboxy-functional and hydroxy-functional emulsion polymer, (f) a carboxy-functional and amide-functional solution polymer and a hydroxy-functional emulsion polymer, (g) a carboxy-functional and amide-functional solution polymer and a carboxy-functional emulsion polymer, (h) a carboxy-functional and amide-functional solution polymer and a carboxy-functional and hydroxy-functional emulsion polymer, (i) a carboxy-functional, hydroxy-functional, and amide-functional solution polymer and a hydroxy-functional emulsion polymer, (j) a carboxy-functional, hydroxy-functional, amide-functional solution polymer and a carboxy-functional emulsion polymer, and (k) a carboxy-functional, hydroxy-functional, amide-functional solution polymer and a carboxy-functional, hydroxy-functional emulsion polymer. Amide functionality may also be incorporated into the emulsion polymer but this is more difficult to achieve efficiently than in the solution polymer, particularly in the case of modified amide functionality, e.g., N-methylolacrylamide.

C. The amino resin crosslinking agent, may be and is hereafter illustrated as a conventional amino resin crosslinking agent of the type long in use as a crosslinking agent in acrylic enamels, e.g., melamine-formaldehyde resins and urea-formaldehyde resins.

DETAILED DESCRIPTION OF FIRST GENERAL METHOD FOR PREPARING PAINTS DESCRIBED HEREIN a. Preparation of Solution Copolymer In preparing the water-soluble copolymer, the functional monomers and the remaining monoethylenically unsaturated monomers are mixed and reacted by conventional free radical initiated polymerization in such proportions as to obtain the copolymer desired. A large number of free radical initiators are known to the art and are suitable for this purpose. These include benzoyl peroxide; t-butyl peroctoate; t-butyl perbenzoate; lauryl peroxide; t-butyl-hydroperoxide; acetylcyclohexane sulfonyl peroxide; diisobutyryl peroxide; di-(2-ethylhexyl) peroxydicarbonate; diisopropyl peroxydicarbonate; t-butylperoxypivalate; decanoyl peroxide; azobix(2-methyl propionitrile); etc. The polymerization is carried out in solution using a solvent which is miscible or dilutable with water. The solvent concentration at this stage is ordinarily about 30 to 60 weight percent of the polymerization solution. The polymerization is carried out at a temperature between about 45° C. and the reflux temperature of the reaction mixture. Included among the suitable solvents are n-propyl alcohol, isopropyl alcohol, dioxane, ethylene glycol monomethyl ether, ethylene glycol monoethyl ether, ethylene glycol monobutyl ether, diethylene glycol monobutyl ether, diethylene glycol monomethyl ether acetate, diethylene glycol monoethyl ether, diethylene glycol monobutyl ether, ethylene glycol monomethyl ether acetate, diethylene glycol monoethyl ether acetate, etc. The copolymer thus obtained is neutralized with amine to a pH of about 6 to 10 and diluted to desired viscosity with water or organic solvent.

b. Preparation of Emulsion Copolymer

In preparing the emulsion copolymer, the functional monomers are mixed and reacted by conventional free-radical initiated polymerization in aqueous emulsion to obtain the copolymer desired.

Conventional surfactants, chain transfer agents, and initiators are employed in the emulsion polymerization. The monomer charge is usually emulsified by one or more micelleforming compounds composed of a hydrophobic part, such as a hydrocarbon group containing six or more carbon atoms, and a hydrophilic part, such as hydroxyl groups, alkali metal, ammonium carboxylate groups, sulfonate groups, phosphate or sulfate partial ester groups, or a polyether chain. Exemplary emulsifying agents include alkali metal sulfonates of styrene, naphthalene, decyl benzene, and dodecyl benzene; sodium dodecyl sulfate; sodium stearate; sodium oleate; the sodium alkyl aryl polyether sulfates and phosphates; the ethylene oxide condensates of long chain fatty acids, alcohols, and mercaptans, and the alkali metal salts of rosin acids. These materials and the techniques of their employment in emulsion formation and maintenance are well known in the art.

A chain transfer agent or mixture of chain transfer agents may be added to the reaction medium to limit the molecular weight of the copolymer; such chain transfer agents are generally mercaptans such as dodecanethiol, benzenethiol, 1-octanethiol, pentanethiol, and butanethiol. These are conventional materials and are employed in a conventional manner. The employment of chain transfer agents in combination with monomers bearing two or more sites of vinyl unsaturation in the concentration range aforementioned results in the formation of copolymers having a bimodal molecular weight distribution.

Analysis by gel permeation chromatography, hereinafter referred to as GPC reveals the presence of two fractions: one, a low molecular weight fraction comprised of polymers similar in molecular weight to polymers obtained when multifunctional monomers are absent, i.e., in the range of about 3,000 to about 20,000 ($\overline{M}_n$); and two, a very high molecular weight crosslinked fraction, a gel, whose molecular weight can not be characterized by the GPC measurement, i.e., of effectively infinite molecular weight.

The polymerization initiator is composed of one or more water-soluble, free-radical-generating species such as hydrogen peroxide or the sodium, potassium, or ammonium persulfates, perborates, peracetates, percarbonates and the like. The polymerization is carried out at a temperature between about 45° C. and the reflux temperature of the reaction mixture. As is well known in the art, these initiators may be associated with activating systems such as redox systems which may incorporate mold reducing agents, such as sulfites and thiosulfites, and redox reaction promoters such as transistion metal ions, and that these allow the polymerization to be carried out at a lower temperature, e.g., 0° C. or below. As, however, it is desirable to maintain a low concentration of non-polymeric ionic species in the finished paint formulation in order that the cured paint film may have optimum resistance to water, it is preferred to use a minimum concentration of such optional inorganic salts as ferrous sulfate, sodium bisulfite, and the like.

Those skilled in the art will be aware that other emulsifying agents, polymerization initiators and chain transfer agents may be used which are compatible with the polymerization system herein required and with the attachment of acceptable cured paint film properties.

As will be disclosed later herein, the solution polymer may also be prepared by emulsion polymerization. In such preparation, the resultant acid-functional copolymer latex is converted to a polymer solution by the addition of an appropriate base, usually ammonia or an organic amine. There are, however, different needs involved in the afterpreparation employment of the emulsion polymer that is used as such in formulation of paint and the solution polymer which although prepared by emulsion polymerization is subsequently converted to a solution polymer and used as such. These needs should be taken into consideration in the preparation procedure.

In the use of emulsion polymerization to produce a solution polymer, there is no need for the resulting latex to be stable under conditions different from those ensuing at the end of the polymerization process since the latex no longer exists, as such, after the polymer goes into solution upon neutralization. To facilitate such conversion to solution polymers, polymers prepared by emulsion polymerization for use as solution polymers ordinarily contain a higher concentration of carboxyl groups and a lower concentration of decidedly hydrophobic monomers, e.g., 2-ethylhexyl acrylate, relative to the corresponding concentrations in the polymers prepared by emulsion polymerization for use as such, and do not contain monomers bearing more than one site of vinyl unsaturation.

In contrast, latices which are used as such in the formulation of paint are required to remain essentially as stable latices throughout the processes of polymerization, paint formulation, and product distribution and use. This implies a requirement of stability, i.e., freedom from coagulum formation through time and under a variety of pH conditions, solvent environment, etc. These requirements are best met, and hence it is preferred to use, an alkali metal or ammonium persulfate either as the sole polymerization initiator, or as one constituent of a mixed initiator system. In those embodiments in which conventional surfactants are used, it is preferred to use a plurality of surfactants, more specifically a combination of anionic and nonionic surfactants, to obtain a more stable latex. Such surfactant mixtures are well known in the art.

c. Formulation of Paint

The polymer solution and the polymer latex prepared according to the aforedescribed procedures are subsequently converted into a paint using conventional paint formulation techniques. Typically, a mill base is prepared which comprises the bulk of the pigment and/or particulate filler of the paint formulation. The mill base is "let down" i.e., blended with the remaining polymeric and liquid constituents of the final formulation. A mill base, prepared by conventional sand grinding, ball milling, or pebble milling generally comprises all or a part of the water-soluble resin, pigments, organic cosolvents, and may also comprise a quantity of amine in excess of that required to solubilize the solution polymer. To complete the paint, the polymer latex which has been neutralized to a pH range of 5.0 to 10, preferably 5 to 9, is added with mild agitation to the balance of the water required in the total formulation. The balance of the water-soluble resin, crosslinking agent, and millbase are added slowly with agitation. Additional quantities of pigment may be added subsequently as slurries in organic solvents or as separate mill bases to adjust the color as desired. The viscosity of the finished paint is determined and adjusted as required to obtain desired application properties.

Alternately, all or a portion of the (preferably neutralized) polymer latex, water, organic cosolvent, and amine may be added to the solution polymer and pigments prior to ball milling, sand grinding, or pebble milling. This procedure is advantageously employed to reduce the viscosity of mill bases prepared using the solution polymers of relatively high molecular weight.

d. Use of Organic Amines

Organic amines are used to neutralize carboxyl groups on the solution polymer and hence to render it soluble in the aqueous dispersion. They are also used to maintain the pH of the finished paint formulation above about 7, e.g., in the range of 7-10, preferably between 7 and 9.5, and with certain pigments such as aluminum flakes preferably between 7 and 9, to prevent premature reaction of the functional groups on the acrylic copolymer with the amino resin cross-linking agent. Those skilled in the art will be aware that in certain embodiments the paint dispersion can be made up at a pH outside the pH range for application and later adjusted to the desired pH shortly before it is applied. A portion of the amine, e.g., preferably between about 60 and 100% of the amount chemically equivalent to the carboxyl functionalty of the polymer is added to the solution polymer directly. Advantageously, a small additional portion of amine is used to raise the pH of the emulsion polymer to about 5 to about 10, preferably 5 to 9, prior to finishing the paint formulation so that the mill base is not subjected to the low pH environment of the polymer latex (pH about 2.5).

Suitable amines are amines (1) which are soluble in the aqueous medium of the paint, (2) that ionize sufficiently in such aqueous medium to solubilize the solution polymer, (3) that ionize sufficiently in such aqueous medium when employed in suitable amounts to provide the paint dispersion with a pH of at least about 7, preferably 7.2 or higher, and thereby keep the rate or reaction between reactive groups of the amino resin (crosslinking agent) negligible prior to curing, and (4) that allow for rapid curing of the enamel upon heating. Suitable amines include alkyl, alkanol and aryl primary, secondary and tertiary amines. Preferred are secondary and tertiary alkyl and alkanol amines having a boiling point within the range of 80°-200° C. By way of example, these include N,N-dimethyl ethanolamine, N,N-diethylethanolamine, isopropanolamine, morpholine, N-methylmorpholine, N-ethylmorpholine, N-methyethanolamine, 2,6-dimethylmorpholine, methoxypropylamine, and 2-amino-2-methyl-1-propanol.

e. Catalysts

Catalysts for the curing of resins described herein are not normally required to obtain satisfactory film properties. If desired, however, for purposes of lowering the film baking temperature or of further improving cured film properties, strong acid catalysts can be employed in an amount not in excess of 3% by weight of the total finished paint formulation. Said strong acid catalysts may be introduced either as copolymerizable species incorporated in one or both acrylic copolymers, e.g., 2-acrylamide-2-methylpropanesulfonic acid, or as a non-polymerizable additive, e.g., p-toluenesulfonic acid. It is generally preferred not to add such catalysts, however, as they may tend to increase the water sensitivity of the cured film and may deleteriously affect storage stability of the liquid paint.

f. Cosolvents

In those embodiments wherein a volatile organic solvent is employed as a cosolvent, i.e., solution of the solution polymer also being affected by the use of a water-soluble amine, the following solvents are suitable for this include: n-propyl alcohol, isopropyl alcohol, butanol, 2-butoxyethanol, 2,2-butoxy)ethoxyethanol, n-octyl alcohol, dioxane, ethylene glycol monomethyl ether, ethylene glycol monoethyl ether, ethylene glycol monobutyl ether, diethylene glycol monomethyl ether, diethylene glycol monoethyl ether, diethylene glycol monoethyl ether, diethylene glycol monobutyl ethylene glycol monomethyl ether acetate, diethylene glycol monoethyl ether acetate, etc.

DETAILED DESCRIPTION OF SECOND GENERAL METHOD FOR PREPARING PAINTS DESCRIBED HEREIN a. Preparation of Solution Polymer In this method, the water-soluble copolymer is produced by emulsion polymerization. The functional monomers are mixed and reacted by conventional free-radical initiated polymerization in aqueous emulsion to obtain the copolymer desired. The resulting acid-functional copolymer latex is converted to a polymer solution by the addition of an appropriate base, usually ammonia or an organic amine.

Conventional surfactants, chain transfer agents, and initiators are employed in the emulsion polymerization. The monomer charge is usually emulsified by one or more micelleforming compounds composed of a hydrophobic part, such as a hydrocarbon group containing six or more carbon atoms, and a hydrophilic part, such as hydroxyl group, alkali metal or ammonium carboxylate groups, phosphate or sulfate partial ester groups, sulfonate groups, or a polyether chain. Exemplary emulsifying agents include alkali metal sulfonates of styrene, naphthalene, decyl benzene and dodecyl benzene; sodium dodceyl sulfate; sodium stearate; sodium oleate, the sodium alkyl aryl polyether or sulfates and phosphates; the ethylene oxide condensates of long chain fatty acids, alcohols, and mercaptans, and the alkali metal salts of resin acids. These materials and the techniques of their employment in emulsion formation and maintenance. As previously pointed out, however, when emulsion polymerization is used to produce a solution polymer, there is no need for the resulting latex to be stable under conditions different from those ensuing at the end of the polymerization process since the latex no longer exists as such after the polymer goes into solution upon neutralization. To facilitate such conversion to solution polymers, polymers prepared by emulsion polymerization for use as a solution polymer ordinarily contain a higher concentration of carboxyl groups and a lower concentration of decidedly hydrophilic monomers, e.g., 2-ethylhexyl acrylate, relative to the corresponding concentrations in the polymers prepared for use as emulsion polymers and do not contain di, tri, or tetra vinyl compounds. Further, the teaching hereinbefore set forth with respect to the choice of initiators when preparing the latter, i.e., using an alkali metal or ammonium persulfate either as the sole polymerization initiator or as one constituent of a mixed initiator system to avoid coagulum formation through time and under a variety of pH conditions, solvent environment, etc., is not applicable where the polymer is to be converted to a solution polymer. Such initiators may be used when preparing the solution polymer by emulsion polymerization but conventional peroxide initiators are quite suitable for this. Hence, this method offers an advantage, in this respect, in that the concentration of ionic inorganic contaminants, e.g., sulfate ions, in the paint formulation is reduced. A chain transfer agent or mixture of chain transfer agents may be added to the reaction medium to limit the molecular weight of the polymer, such chain transfer agents are generally mercaptans such as dodecanethiol, benzenethiol, 1-octanethiol, pentanethiol and butanethiol. These are conventional materials employed in a conventional manner. The polymerization initiator is composed of one or more water-soluble, free-radical-generating species such as hydrogen peroxide or the sodium, potassium or ammonium persulfates, perborates, peracetates, percarbonates and the like. As is well known in the art, these initiators may be associated with activating systems such as redox system which may incorporate mild reducing agents, such as sulfites and thiosulfites and redox reaction promoters such as transition metal ions. As hereinbefore mentioned, however, it is desirable to maintain a low concentration of non-polymeric ionic species in the finished paint formulation in order that the cured paint film may have optimum resistance to water. Hence, it is preferred to use a minimum concentration of such optional inorganic salts as ferrous sulfate, sodium bisulfite, and the like. Those skilled in the art will be aware that other emulsifying agents, polymerization initiators and chain transfer agents may be used which are compatible with the polymerization system herein required and with the attainment of acceptable cured paint film properties.

b. Preparation of Emulsion Copolymer

The emulsion copolymer may be prepared using the same procedures hereinbefore recited for preparation of the emulsion copolymer in part (b) of the first general method.

c. Formulation of Paint

The polymer solution and the polymer latex prepared according to the aforedescribed procedures may be subsequently converted into a paint using the same procedures hereinbefore recited for formulation of paint in part (c) of the first general method.

d. Use of Organic Amines

The use of organic amines and amines which are suitable for such use are the same for this general method as hereinbefore described in detail in part (d) of the first general method.

e. Catalysts

The use of catalysts and catalysts which are suitable for curing the resins hereinbefore described and hereinafter illustrated are the same for this general method as hereinbefore described in detail in part (d) of the first general method.

f. Cosolvents

The use and choice of cosolvents for use with this general method may be the same as hereinbefore described in part (f) of the first general method.

DETAILED DESCRIPTION OF THIRD GENERAL METHOD FOR PREPARING PAINTS DESCRIBED HEREIN

The third general method for preparing the paints disclosed herein is identical with the first general method hereinbefore described in detail except for the difference that all of a part of the surfactant, i.e., surface active agent or emulsifier, employed in preparing the emulsion polymer, is replaced with a stabilizer polymer, that is identical with or similar to, the solution polymer heretofore described in the first and second general methods and employed as a primary constituent of the paints described herein.

The stabilizer polymer of the third and fourth general methods is carboxy-functional and soluble in the aqueous phase of these paint dispersions and is either the same as the primary solution polymer, heretofore discussed, or similar to such solution polymer and compatible with the system. The average molecular weight ($\overline{M}_n$) of the stabilizer polymer may be the same as that of the primary solution polymer, i.e., between 3,000 and 20,000 but advisedly is of lower molecular weight than the primary solution polymer. Preferably, the average molecular weight of this third copolymer is in the range of about 3,000 to about 8,000. Its Tg is in the range of $-15°$ to $50°$ C. When the stabilizer polymer is used in lieu of the surfactant to prepare either the solution polymer or the emulsion polymer, it is present in a concentration in the range of about 0.2 to about 10, preferably about 0.5 to about 5, weight percent based on the weight of polymer to be prepared.

The stabilizer polymer may be prepared by any of several methods, including (1) the method used to prepare the solution polymer of the first general method of paint preparation, i.e., polymerization in solution in a water miscible or dilutable organic solvent; (2) the method used to prepare the solution polymer for the second general method of paint preparation, i.e., emulsion polymerization using an emulsifier or surfactant; (3) emulsion polymerization using in lieu of a surfactant a small amount of the intended polymer from a previous preparation; and (4) a method of emulsion polymerization described hereinafter which employs neither surfactant nor a water soluble polymer in lieu thereof. In the latter, conventional chain transfer agents and polymerization initiators are used as described hereinbefore for the preparation of a solution polymer by emulsion polymerization. A mixture of monomers including carboxyl functional monomers and a chain transfer agent is added slowly to a stirred mixture of initiator and water maintained at a suitable reaction temperature, e.g., between 45° and 95° C. It is preferred to add simultaneously with the monomer mixture an additional quantity of polymerization initiator to sustain a sufficient initiator concentration throughout the polymerization. The polymer latex so obtained is filtered and neutralized with ammonia or water-soluble amine to render it water soluble. No di-, tri- or tetra-vinyl compounds are used in preparation of the stabilizer polymer.

DETAILED DESCRIPTION OF FOURTH GENERAL METHOD FOR PREPARING PAINTS DESCRIBED HEREIN

The fourth general method for preparing the paints disclosed herein is identical with the second general method hereinbefore described in detail except for the difference that all or a part of the surfactant used to prepare the solution polymer, the emulsion polymer or, preferably, both the solution polymer and the emulsion polymer is replaced by a stabilizer polymer, such as heretofore described in detail in the description of the third general method.

This invention will be more fully understood from the following illustrative examples:

EXAMPLE 1

A heat-curable coating composition suitable for automotive topcoat application is prepared from (a) an aqueous acrylic copolymer latex, said copolymer having multifunctional acrylates as constituent monomers in a concentration within the range heretofore recited, (b) an aqueous solution of a second acrylic copolymer and (c) an amino resin crosslinking agent, in the manner hereinafter set forth:

Step I. Preparation of Acrylic Copolymer Latex

| Monomers and Additives | Parts by Weight |
|---|---|
| styrene | 30 |
| butylmethacrylate | 50 |
| hydroxypropylmethacrylate | 18 |
| acrylic acid | 2 |
| trimethylolpropanetriacrylate | 3 |
| 1-pentanethiol | 0.5 |
| water | 73.3 |
| Triton X-200[1] | 1.2 |
| Triton X-305[2] | 4.3 |
| ammonium persulfate | 0.4 |
| Reactor Charge | |
| water | 49 |
| Triton X-200 | 1.7 |
| ammonium persulfate | 0.1 |

[1] a product of Rohm and Haas Company, characterized as an anionic surfactant containing 28% active component described as the sodium salt of an alkyl aryl polyether sulfonate.
[2] a product of Rohm and Haas Company, characterized as a nonionic surfactant containing 70% active component described as an alkylarylpolyether alcohol averaging 30 ethylene oxide units per molecule.

(1) a product of Rohm and Haas Company, characterized as an anionic surfactant containing 28% active component described as the sodium salt of an alkyl aryl polyether sulfonate. (2) a product of Rohm and Haas Company, characterized as a nonionic surfactant containing 70% active component described as an alkylarylpolyether alcohol averaging 30 ethylene oxide units per molecule.

The reactor charge is heated to boiling in a reaction vessel equipped with a stirrer, reflux condenser, nitrogen inlet tube, addition funnel and thermometer and then cooled to 90° ± 5° C. (ammonium persulfate may be added as a delayed portion in 1% aqueous solution prior to addition of emulsified monomers). The monomer mixture is mixed with the listed additives and an emulsion is formed by stirring. The monomer emulsion is added continuously over a period of 2 to 2.5 hours. The temperature of the reactor charge is maintained at 90° ± 5° C. during addition of the monomer emulsion and is maintained for 2 hours after addition to permit further reaction. The latex so obtained is cooled to room temperature, filtered and formulated into paint as hereinafter described. The molecular weight of the uncrosslinked portion of the latex polymer so prepared ($M_n$) is about 10,000. Its glass transition temperature, Tg, is about 52° C. (calculated from the monomeric composition without regard to molecular weight, as are all Tg values herein given). Step II. Preparation of Water-Soluble Acrylic Polymer A water-soluble, acrylic copolymer is prepared from the following materials:

| Monomers and Initiator | Parts by Weight |
|---|---|
| styrene | 20.0 |
| hydroxypropylmethacrylate | 10.0 |
| acrylic acid | 8.0 |
| butylmethacrylate | 37.0 |
| 2-ethylhexylacrylate | 20.0 |
| methylmethacrylate | 5.0 |
| t-butylperbenzoate | 3.0 |
| Reactor Charge | |
| 2(2-butoxyethoxy)ethanol | 43 |

The reactor charge is heated to 150° C. under a nitrogen atmosphere. The mixture of monomers and initiator is added over a 2-hour period. The temperature is maintained at about 150° C. during and for 2 hours following the monomer addition. The polymer solution obtained is cooled to room temperature, neutralized with 90% of the calculated equivalent weight (based on acidfunctional comonomers) of dimethyl-aminoethanol, and reduced to 60% solids with water. This polymer has average molecular weight ($M_n$) of about 4,000 and its Tg is about 14° C. Step III. Formulation of Paint A mill base is prepared by pebble milling together the following materials:

| Components | Parts by Weight |
|---|---|
| titanium dioxide pigment | 12.2 |
| ferrite yellow pigment | 9.8 |
| polymer solution from Step II | 14.5 |
| 2(2-butoxyethoxy)ethanol | 2.6 |
| water | 2.4 |

An enamel is then prepared by blending this mill base with the following materials.

| Materials | Parts by Weight |
|---|---|
| latex from Step I | 89.0 |
| 10% aqueous dimethylaminoethanol | 2.0 |
| polymer solution from Step II | 43.8 |
| Cymel 301[1] | 25 |
| 2(2-butoxyethyl)ethanol | 7.5 |
| water | 62.5 |

(1) a commercial grade of hexamethoxymethylmelamine marketed by American Cyanamid Company.

The enamel so obtained is reduced with water to spray viscosity (about 20 seconds, Ford Cup No. 4, following ASTM D-1200), applied to primed steel panels, i.e., mild steel panels to which has been applied a conventional epoxy type automotive primer coating, by spraying and cured for 20 minutes at 180° C. The cured film has a 20° gloss of about 80, determined in accordance with ASTM D-523. This cured film demonstrates no visible change after soaking in water at 32° C. for 240 hours. This film displays excellent solvent resistance and is essentially without surface defects, i.e., cratering.

EXAMPLE 2

The procedures of Example 1 are repeated with the single difference that in the preparation of the emulsion polymer in Step I multifunctional monomers are not employed. The cured films exhibit craters spaced apart over all of the painted object. It is estimated to have at least one crater per square centimeter.

EXAMPLE 3

The procedures of Example 1 are repeated with the following differences: the emulsion of monomers of Step I is prepared from the following reactant monomers, all other materials employed in preparing the latex being the same in kind and quality as in Example 1.

| Monomers | Parts by Weight |
|---|---|
| styrene | 25 |
| butylmethacrylate | 30 |
| 2 ethylhexylacrylate | 20 |
| methylmethacrylate | 5 |
| hydroxypropylmethacrylate | 18 |
| acrylic acid | 2 |
| trimethylolpropanetriacrylate | 3 |

The molecular weight of the uncrosslinked portion of this latex polymer ($\overline{M}_n$) is about 10,000 and has a glass transition temperature of about 17° C. Essentially equivalent results are obtained relative to Example 1.

EXAMPLE 4

The procedures of Example 1 are repeated with the single difference that, in the preparation of the emulsion polymer in Step I, the emulsion of monomers is prepared from the following reactant monomers, all other materials employed in preparing the latex being the same in kind and quantity as in Examples 1 and 2.

| Monomers | Parts by Weight |
|---|---|
| styrene | 30 |
| butylmethacrylate | 50 |
| hydroxypropylmethacrylate | 18 |
| acrylic acid | 2 |
| trimethylolpropanetriacrylate | 2 |
| 1, 6-hexanedioldiacrylate | 1 |

The enamel, prepared in accordance with Example 1, displays excellent solvent resistance and is essentially without surface defects, i.e., cratering.

EXAMPLE 5

The procedures of Example 1 are repeated with the single difference that in the preparation of polymer latex of Step I, two parts of 1,6-hexanedioldiacrylate are used in lieu of three parts of trimethylolpropane triacrylate. The physical properties of the resultant paint film are essentially the same; baked films are essentially free from surface defects.

EXAMPLE 6

The procedures of Example 4 are repeated except that a paint is formulated according to the procedures of Example 1 using the following components.

| Components | Parts by Weight |
|---|---|
| latex from Example 4 | 89 |
| 10% aqueous dimethylaminoethanol | 2 |
| polymer solution from Step II, Example 1 | 43.8 |
| yellow mill base from Step III, Example 1 | 41.5 |
| butylated melamine[1] | 35.7 |
| water[2] | 68 |

[1]70% solid in butanol, manufactured by Ford Motor Company, Product No. A35130.
[2]at least a major portion of the water is preferably withheld and added at the end of the formulation.

(1) 70% solid in butanol, manufactured by Ford Motor Company, Product No. A35130. (2) at least a major portion of the water is preferably withheld and added at the end of the formulation.

The enamel so obtained is reduced with water to spray viscosity, applied to primed steel panels, i.e., mild steel panels to which has been applied a standard epoxy type automotive primer, by spraying and cured for 20 minutes at 135° C. The cured film has a 20° gloss at least 75, determined by ASTM D-523. This film demonstrates no visible change after soaking in water at 32° C. for 240 hours. This film displays excellent solvent resistance and is essentially free from surface defects, i.e., cratering.

EXAMPLE 7

A series of latexes are prepared as in Example 1. The materials employed in preparing these latexes are set forth below:

| Materials | Polymer Designation and Parts by Weight | | | | | | | |
|---|---|---|---|---|---|---|---|---|
| | A | B | C | D | E | F | G | H |
| styrene | 30 | 30 | 30 | 30 | 30 | 30 | 30 | 30 |
| butylmethacrylate | 50 | 50 | 50 | 50 | 50 | 50 | 50 | 50 |
| hydroxypropylmethacrylate | 18 | 18 | 18 | 18 | 18 | 18 | 18 | 18 |
| acrylic acid | 2 | 2 | — | — | 2 | 2 | 2 | 2 |
| methacrylic acid | — | — | 2 | — | — | — | — | — |
| Triton X-200 | 1.2 | 1.2 | 1.2 | 1.2 | — | 1.2 | 1.2 | 1.2 |
| Triton X-305 | 4.3 | 4.3 | 4.3 | 4.3 | 4.3 | 4.3 | 4.3 | 4.3 |
| EP 110[1] | — | — | — | — | 1.3 | — | — | — |
| 1,6-hexanediol-diacrylate | 1.5 | 1.8 | 2 | 2 | 2 | — | — | — |
| trimethylolpropane trimethacrylate | — | — | — | — | — | 6 | — | — |
| pentaerythritol tetramethacrylate | — | — | — | — | — | — | 3 | 4 |

[1]an anionic surfactant marketed by GAF Corporation, a 30% solid aqueous solution containing ammonia salts of surfactant alkyl phenoxy polyethyleneoxy ethanol. Paints formulated from these latexes according to the procedures of Example 1 yield films essentially free from cratering.

(1) an anionic surfactant marketed by GAF Corporation, a 30% solid aqueous solution containing ammonia salts of surfactant alkyl phenoxy polyethyleneoxy ethanol. Paints formulated from these latexes according to the procedures of Example 1 yield films essentially free from cratering.

EXAMPLE 8

The series of Example 7 is repeated with the difference that, in the preparation of the emulsion in Step I, the emulsion of monomers is prepared from the following reactant monomers:

| Materials | Polymer Designation and Parts by Weight | | | | | | | |
|---|---|---|---|---|---|---|---|---|
| | A | B | C | D | E | F | G | H |
| styrene | 25 | 25 | 25 | 25 | 25 | 25 | 25 | 25 |
| butylmethacrylate | 30 | 30 | 30 | 30 | 30 | 30 | 30 | 30 |
| 2-ethylhexyl-acrylate | 20 | 20 | 20 | 20 | 20 | 20 | 20 | 20 |
| methylmethacrylate | 5 | 5 | 5 | 5 | 5 | 5 | 5 | 5 |
| hydroxypropyl methacrylate | 18 | 18 | 18 | 18 | 18 | 18 | 18 | 18 |
| acrylic acid | — | 2 | 2 | 2 | 2 | 2 | 2 | — |
| methacrylicacid | 2 | — | — | — | — | — | — | — |
| 1,6-hexanediol-diacrylate | 2 | 1 | 1.5 | 1.8 | — | — | — | 2 |
| trimethylolpropane trimethylacrylate | — | — | — | — | 6 | — | — | — |

-continued

| Materials | Polymer Designation and Parts by Weight | | | | | | |
|---|---|---|---|---|---|---|---|
| trimethylolpropane triacrylate | — | 2 | — | — | — | — | — |
| pentaerythritol tetramethacrylate | — | — | — | — | — | 3 | 4 | — |

Paints formulated from these latexes according to the procedures of Example 1 yield films essentially free from cratering.

EXAMPLE 9

The procedures of Example 1 are repeated with the single difference that, in the formulation of paint in Step III, 25 parts of Cymel 300 are used in lieu of Cymel 301 (Cymel 300 is also a commercial grade of hexamethoxymethylmelamine, a product of American Cyanamid Company). The paint so obtained is diluted with water to sprayable viscosity and sprayed on primed steel panels as before. The physical properties of the resultant paint film are essentially the same as depicted in Example 1, especially without surface defect.

EXAMPLE 10

The procedures of Example 1 are repeated with the difference that the ratio of polymer obtained from the latex of Step I to that of the solution polymer of Step II is varied as follows:

| | Polymer Designation and Parts by Weight | | | | | | |
|---|---|---|---|---|---|---|---|
| | A | B | C | D | E | F | G |
| polymer from latex | 85 | 75 | 70 | 65 | 50 | 35 | 25 |
| polymer from solution | 15 | 25 | 30 | 35 | 50 | 65 | 75 |

Coatings C, D, E and F exhibit acceptable gloss, i.e., equal to or greater than 70° at 20°, and appearance. Coatings A and B display lower gloss and some surface roughness. Coating G has excellent gloss but displays a greater tendency to sag during spray application and considerably more solvent popping during cure at a given film thickness than do coatings A-F.

EXAMPLE 11

The procedures of Example 5 are repeated with the difference that the water-soluble resin is prepared from the following materials:

| Monomer Mixture and Initiator | Parts by Weight |
|---|---|
| styrene | 30 |
| butylmethacrylate | 50 |
| hydroxypropylmethacrylate | 8 |
| acrylic acid | 10 |
| t-butyl perbenzoate | 5 |
| reactor charge | |
| 2(2-butoxyethoxy) ethanol | 43 |

The polymer thus obtained has average molecular weight ($M_n$) of about 3,500 and its Tg is about 59° C.

The paint so obtained has excellent resistance properties and is free of visible surface defects, e.g., cratering. Dirt pick-up inside the curing oven during baking is greatly reduced relative to comparable coatings having no multifunctional monomers in the latex polymer.

EXAMPLE 12

In this example and Example 13, both the solution resin and the emulsion resin are prepared by emulsion polymerization. Paints thus prepared are free of organic solvents unless such solvent is deliberately added.

Step I. Preparation of the Solution Polymer

An acrylic copolymer soluble in the aqueous phase of the water-based paint of which it later becomes a part is prepared from the following materials in the manner hereinafter described.

| Materials | Parts by Weight |
|---|---|
| methylmethacrylate | 45.0 |
| methacrylic acid | 15.0 |
| butylacrylate | 40.0 |
| water | 90.0 |
| Triton X-200[1] | 1.15 |
| Triton X-305[2] | 3.58 |
| potassium persulfate | 0.4 |
| 1-octanethiol | 1.5 |
| Reactor Charge | |
| Triton X-200[1] | 1.67 |
| potassium persulfate | 0.1 |
| water | 60.0 |

[1] defined in Example 1.
[2] defined in Example 1.

The reactor charge is heated gradually to boiling and cooled to 95° C. A monomer emulsion is formed from the materials above listed by mixing and stirring. The monomer emulsion is added to the hot reactor charge over a two-hour period. The temperature is maintained at 95° ± 5° C. throughout the monomer addition period and for two hours after addition is complete. There is added 2-(dimethylamino) ethanol in an amount chemically equivalent to the acid monomer incorporated in the polymer and the solid content is reduced with water to 30 percent by weight. The molecular weight of polymer ($\overline{M}_n$), is about 5000 and the calculated Tg is 25° C.

Step II. Formulation of Paint Free of Organic Solvent

A mill base is prepared by pebble milling together the following materials.

| Materials | Parts by Weight |
|---|---|
| Titanium dioxide pigment | 12.2 |
| ferrite yellow pigment | 9.8 |
| polymer solution from Step I | 30.0 |
| water | 5.0 |

An enamel is formulated by blending together the following materials:

| Materials | Parts by Weight |
|---|---|
| latex from Example 1 | 89.0 |
| 10% aqueous dimethylaminoethanol | 2.0 |
| polymer solution from Step I | 86.7 |
| Cymel 301 | 25.0 |
| water | 46.0 |

The viscosity of the paint is adjusted to about 20 seconds (No. 4 Ford Cup), and sprayed on primed steel panels. The panels are baked 25 minutes. The baking temperature at the beginning is 80° C. This is increased gradually to 180° C. and maintained at 180° C. over a 10 minute period. The resultant panels having a coating of excellent glossy appearance and organic solvent resistance (one minute xylene exposure). The appearance and hardness of these coatings do not visibly change when water soaked at 32° C.

EXAMPLE 13

A series of water dilutable polymers are prepared following the procedure of Step I of Example 12 and employed in place of the water dilutable polymer of Step I, Example 12 in the water-based paint described in Example 12. Essentially equivalent results are obtained. The materials employed in preparing these "solution polymers" and the molecular weights and glass transition temperature of the resultant copolymers are set forth below.

| Materials | Polymer Designation | | |
|---|---|---|---|
| | A | B | C |
| styrene | 25 | — | — |
| methylmethacrylate | — | 45 | 35 |
| methacrylic acid | 15 | 15 | 15 |
| butylacrylate | 25 | 40 | 50 |
| butylmethacrylate | 35 | — | — |
| Triton X-200 | 2.8 | 2.8 | 2.8 |
| Triton X-305 | 3.6 | 3.6 | 3.6 |
| 1-octanethiol | 1.5 | 2 | 1.5 |
| ($\overline{M}_n$) | 5400 | 4000 | 5400 |
| $Tg^\circ$ C. | 16 | 25 | 8 |

The following examples illustrate method embodiments wherein the paints of this invention are prepared by substituting for the surfactant used in the preceding examples a stabilizer polymer which is a solution polymer, i.e., a polymer that is soluble in the aqueous phase of the water-based paint. As aforementioned, this stabilizer polymer may be the same as the solution polymer which is a primary constituent of the paint or it may differ therefrom so long as it is crosslinkable with another polymer or crosslinking agent in the system and is otherwise compatible with the system. The average molecular weight of the stabilizer polymer may be the same as that of the primary solution polymer but preferably has lower molecular weight and most preferably has average molecule weight ($\overline{M}_n$) in the range of about 3,000 to about 8,000. The stabilizer polymer will ordinarily be present in an amount in the range of about 0.5 to about 10 weight percent of the combined weights of emulsion polymerized polymers in the paint.

EXAMPLE 14

A water-based paint is prepared from the following materials:

Step I Preparation of Stabilizer Polymer

There is charged to a reactor 200 parts of water. The reactor charge is heated to boiling and then cooled to 95° C. To the reactor charge is added Solution A, a solution of 0.1 parts of ammonium persulfate in 0.8 parts of water. A solution, hereinafter termed Solution B is prepared from 0.4 parts of ammonium persulfate in 2.5 parts water. A reactant monomer and chain transfer agent mixture is formed from the following materials.

| Materials | Parts by Weight |
|---|---|
| methyl methacrylate | 35 |
| methacrylic acid | 15 |
| butyl acrylate | 50 |
| 1-octanethiol | 2 |

The monomer mixture and Solution B are simultaneously charged to the reactor by incremental addition over a 2-hour period. The temperature of the reaction mixture is maintained for 3 hours after addition of the last of the reactants. The latex so obtained is cooled to room temperature and filtered. The polymer thus obtained, hereinafter termed stabilizer polymer I, is then neutralized with 2-(dimethylamino)ethanol in an amount equivalent to the acid monomer content of the polymer. A clear solution is obtained.

Step II Preparation of Emulsion Polymer

An emulsion polymer is produced by first preparing the following: (1) there is charged to the reactor 200 parts of water and 4.25 parts of the stabilizer polymer from Step I; (2) the following materials are thoroughly mixed:

| Materials | Parts by Weight |
|---|---|
| styrene | 20.0 |
| methacrylic acid | 15.0 |
| butylacrylate | 55.0 |
| butylmethacrylate | 10.0 |
| 1,6-hexanedioldiacrylate | 2 |

(3) there are dissolved 0.5 parts of ammonium persulfate in 2.5 parts of water. After these are prepared, the emulsion polymer is prepared using the procedure and conditions used to prepare the stabilizer polymer of Step I. In such, the order of addition of the four above-listed components is as follows: (4) is added to (1) in the reactor and (2) and (3) are added simultaneously to the mixture of (1) and (4).

Step III Preparation of the Solution Polymer

The procedures and steps of Step II of this example are repeated with the following employment of reactant monomers:

| Materials | Parts by Weight |
|---|---|
| methyl methacrylate | 35 |
| methacrylic acid | 15 |
| butylacrylate | 50 |
| 1-octanethiol | 2 |

After this latex is cooled and filtered, it is neutralized with 2-(dimethylamino)ethanol to the amount equivalent to the methacrylic acid constituent of the polymer.

| Step IV Preparation of the Organic Solvent-Free Surfactant-Free Hybrid Water-Based Enamel | |
|---|---|
| Materials | Parts by Weight |
| solution polymer from Step III | 28.4 |
| Cymel 300 | 6.5 |
| titanium dioxide | 16.1 |
| water | 6.4 |

The above materials are ball milled for 16 hours and mixed (let down) with the following materials:

| Materials | Parts by Weight |
|---|---|
| latex from Step II (includes both emulsion polymer and stabilizer polymer I) | 32.5 |
| 10% aqueous 2-(dimethylamino)ethanol | 9.6 |

The viscosity of the paint is adjusted to 17–20 seconds (No. 4 Ford Cup), and sprayed on primed steel panels. The panels are baked 25 minutes. The baking temperature at the beginning is 80° C. This is increased gradually to 180° C. and maintained at 180° C. over a tenminute period. The resultant panels have a coating of excellent gloss and organic solvent resistance (one minute xylene exposure). Appearance and hardness are excellent and do not noticeably change when water soaked at 32° C.

Example 15

A water-based enamel is prepared in from the following materials:

Step 1 Preparation of Latex (includes stabilizer polymer and emulsion polymer)

1. There is charged to a reactor 127 parts of water and two parts of the stabilizer polymer prepared in Step I of Example 14.
2. The following reactant monomers and chain transfer agent are thoroughly mixed.

| Materials | Parts by Weight |
|---|---|
| styrene | 20.0 |
| hydroxypropylmethacrylate | 14.0 |
| methacrylic acid | 6.0 |
| butyl acrylate | 30.0 |
| butyl methacrylate | 30.0 |
| 1,6-hexanedioldiacrylate | 1.8 |
| 1-octanethiol | 0.6 |

3. There is dissolved 0.5 parts of ammonium persulfate in 16.7 parts of water.
4. There is dissolved 0.1 parts of ammonium persulfate in 16.7 parts of water.

The reactor charge is heated to boiling and cooled to 95° C. After the solution of (4) is charged to the reactor, there is added to the reaction medium 0.45 parts of the monomer mixture of (2) and the temperature is held at 95° C. without further addition of reactants for 15 minutes. The remaining portion of the monomer mixture is added simultaneously and incrementally with the solution of (3) over a 2-3 hour period, while the temperature is maintained. The temperature is maintained at 95° C. for 2 hours after the addition of monomers is complete. The latex so obtained is cooled and filtered.

Step II Coating Formulation

The latex obtained in Step I of this example is substituted for the latex of Step II of Example 14 and a water-based enamel is prepared using the procedures and other ingredients used to prepare the water-based enamel in Example 14.

EXAMPLE 16

The procedures of Example 14 are repeated with the difference that the solution resin (Step III) is prepared from the following materials:

1. There is charged to the reactor 119 parts of water and 1.8 parts of the stabilizer polymer prepared in Step I of Example 14.
2. The following reactant monomers and chain transfer agent are thoroughly mixed.

| Materials | Parts by Weight |
|---|---|
| butyl methacrylate | 10.0 |
| methyl methacrylate | 35.0 |
| methacrylic acid | 15.0 |
| butyl acrylate | 40.0 |
| 1-octanethiol | 1.5 |

3. There is dissolved 0.5 parts of ammonium persulfate in 25 parts of water.
4. There is dissolved 0.2 parts of ammonium persufate in 5 parts of water.

After the latex preparation procedures of Example 14 are carried out and the resultant latex is cooled and filtered, the polymer is neutralized with water-soluble amine as in the preceding examples.

EXAMPLE 17

A surfactant-free hybrid water-based enamel containing organic solvent is prepared using the formulation procedures of Step IV of Example 14 with the following differences:

| Materials | Parts by Weight |
|---|---|
| solution polymer from Example I, Step II | 16 |
| Cymel 301[(1)] | 7.0 |
| titanium dioxide | 17.4 |
| isopropanol | 2.8 |
| n-butanol | 3.5 |
| latex from Example 14, Step II (emulsion polymer plus stabilizer polymer I) | 3.5 |
| 10% aqueous 2-(dimethylamino) ethanol | 22 |

[(1)]defined in Example 1.

The enamel when adjusted by water to a viscosity of 20 seconds (Ford Cup No. 4) is sprayed in a conventional manner upon primed steel panels and baked for 30 minutes. The initial baking temperature is 80° C. This temperature is gradually raised to 180° C. and held there for at least 10 of the 30 minutes.

EXAMPLE 18

The procedures of Example 1 is repeated with the single difference that in lieu of the commercially available amino resin (Cymel 300) crosslinking agent there is used a chemically equivalent amount of a urea-formaldehyde resin prepared from the following materials and in the following manner and comparable results are obtained:

Preparation of Urea-Formaldehyde Resin

In a one liter three-necked flask equipped with reflux condenser, thermometer, and stirrer are placed 243 g. of 37% aqueous formaldehyde and 4-6 g. of concentrated ammonium hydroxide to bring the pH to 7.5-8.5 Sixty g. urea is added with stirring and the mixture heated to 100° C. over a one-hour period by means of a heating mantle. This temperature is maintained 10 and ½ hours 64 g. methanol is added, followed by enough phosphoric acid to bring the pH to 5.5. The reaction is stirred for one hour. Water can be removed by heating 60°-70° C. under a water aspirator pressure of 100-200 mm. The resin can be dissolved in isopropyl alcohol to give a 60 percent solution.

EXAMPLE 19

The procedure of Example 4 is repeated with the single difference that the one part by weight of the 1,6-hexanediolacrylate in Step I is replaced by one part by weight of divinyl benzene and comparable results are obtained.

The term "parts" when used herein without further designation shall mean "parts by weight".

The term "acrylic monomer" shall mean acrylic acid, methacrylic acid, esters of acrylic acid and a $C_1 - C_8$ monohydric alcohol, e.g., ethyl acrylate, butyl acrylate, hexyl acrylate and 2-ethylhexyl acrylate, esters of methacrylic acid and a $C_1$ - $C_8$ monohydric alcohol, e.g., methyl methacrylate, butyl methacrylate, hexyl methylacrylate and 2-ethylhexyl methacrylate, hydroxyalkyl acrylates, e.g., hydroxyethyl acrylate and hydroxypropyl acrylate, hydroxyalkyl methacrylates, e.g., hydroxyethyl methacrylate and hydroxypropyl methacrylate, acrylamide, methacrylamide, methylolacrylamides, e.g., n-methylolacrylamide, methylolmethacrylamides, e.g., N-methylolmethacrylamide, alkyl ethers of methylolacrylamides, e.g., N-isobutoxymethylolacrylamide, and alkyl ethers of methylolmethacrylamides, e.g., N-isobutoxymethylolmethacrylamide.

The term "copolymer of acrylic monomers" shall mean a polymer of at least two different monoethylenically unsaturated monomers of which are more than 50 mole percent are acrylic monomers.

The term "water-dilutable organic solvent" means an organic solvent or mixture of organic solvents which is either miscible with water or will mix with water up to a concentration of at least one volume of solvent per three volumes of water without phase separation. Ordinarily, such solvent, when present in the paint, enters the paint through its use in the preparation of the solution resin, as hereinbefore described. In such embodiment, the solution polymer is, of course, soluble therein. In another embodiment, it may be added independently, if desired. In the latter case, the solution polymer may not be fully soluble therein.

While there have been described herein what are at present considered preferred embodiments of the invention it will be obvious to those skilled in the art that modifications and changes may be made in the exemplary embodiments without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

What is claimed is:

1. In an aqueous dispersion of paint in which a carboxy-functional polymer is at least partially neutralized with a water-soluble amine and dispersed with an amino resin crosslinking agent selected from melamine-formaldehyde resins and urea-formaldehyde resins in an aqueous solution of water and a water-soluble amine, the improvement wherein the film-forming components of said dispersion of paint exclusive of said amino resin comprises the combination of:

I. about 30–70 parts by weight of a solution polymer which is a carboxy-functional copolymer of acrylic monomers that:
  A. is at least partially neutralized with watersoluble amine,
  B. is essentially soluble in said aqueous solution,
  C. has average molecular weight ($\overline{M}_n$) in the range of about 3,000 to about 20,000 and
  D. has Tg in the range of $-15°$ C. to $50°$ C., and II. about 70 to about 30 parts by weight of an emulsion polymer selected from carboxy-functional, hydroxy-functional and carboxy-and hydroxy-functional copolymers of acrylic monomers, the constituent monomers of said emulsion polymer consisting of
  A. about 98 to about 99.5 mole percent of monoethylenically unsaturated monomers consisting essentially of acrylates, methacrylates, acrylic acid, methacrylic acid and vinyl hydrocarbons, and
  B. about 0.5 to about 2 mole percent of multiolefinically unsaturated monomers consisting essentially of diacrylates, dimethacrylates, triacrylates, trimethacrylates, tetraacrylates, tetramethacrylates, and divinyl hydrocarbons, that
    1. is essentially insoluble in said aqueous solution,
    2. has Tg in the range of $-15°$ to $50°$ C., and
    3. has bimodal molecular weight distribution and comprises
      a. a noncrosslinked fraction having average molecular weight ($\overline{M}_n$) in the range of about 3000 to about 20,000 and
      b. a crosslinked fraction constituting a gel,
and wherein said amino resin crosslinking agent is present in an amount in the range of about 15 to about 35 weight percent of the sum of the weights of said solution polymer and said emulsion polymer.

2. An aqueous dispersion of paint in accordance with claim 1 wherein said crosslinked fraction of said emulsion polymer has effectively infinite molecular weight.

3. An aqueous dispersion of paint in accordance with claim 1 adapted for spray paint application by adjusting the water content thereof to between about 50 and about 65 weight percent of said dispersion and adjusting the pH to between 7 and 10.

4. An aqueous dispersion of paint in accordance with claim 3 wherein about 5 to about 20 volume percent of the water in said dispersion is displaced by an equal volume of an essentially non-ionizable organic solvent for said solution resin.

5. An aqueous dispersion of paint in accordance with claim 4 wherein said organic solvent is an alcohol.

6. An aqueous dispersion of paint in accordance with claim 1 wherein in addition to said solution polymer and said emulsion polymer, said paint dispersion contains a stabilizer polymer which is a carboxy-functional acrylic copolymer that is soluble in said aqueous solution, has average molecular weight ($\overline{M}_n$) below that of said solution polymer and is present in said aqueous dispersion in an amount in the range of about 0.01 to about 10 parts by weight.

7. An aqueous dispersion of paint in accordance with claim 1 wherein in addition to said solution polymer and said emulsion polymer, said paint dispersion contains a stabilizer polymer which is a carboxy-functional copolymer of acrylic monomers that is soluble in said aqueous solution, has average molecular weight ($\overline{M}_n$) in the range of about 3000 to about 8000, and is present in said aqueous dispersion in an amount in the range of about 0.025 to about 5 parts by weight.

* * * * *

UNITED STATES PATENT OFFICE
CERTIFICATE OF CORRECTION

PATENT NO. : 4,062,823
DATED : December 13, 1977
INVENTOR(S) : Mo-Fung Cheung and Ray A. Dickie It is certified that error appears in the above-identified patent and that said Letters Patent are hereby corrected as shown below:

Delete line 28 at column 18;

Insert for line 28 the following:

-- in 25 parts of water. (4) There are dissolved 0.1 parts ammonium persulfate in 5 parts water. --

Signed and Sealed this

Second Day of May 1978

[SEAL]

Attest:

RUTH C. MASON
Attesting Officer

LUTRELLE F. PARKER
Acting Commissioner of Patents and Trademarks